March 17, 1953 A. Y. DODGE 2,631,706
SPRAG TYPE ONE-WAY CLUTCH
Filed March 26, 1949
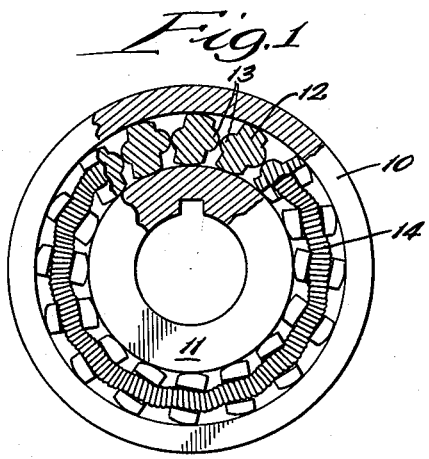
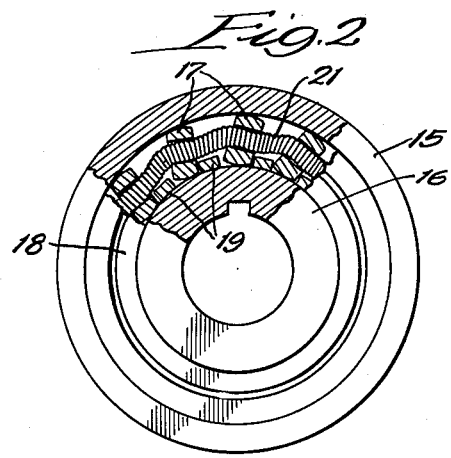
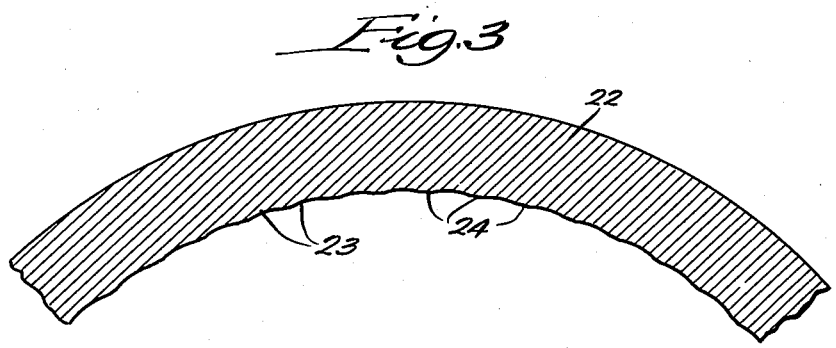
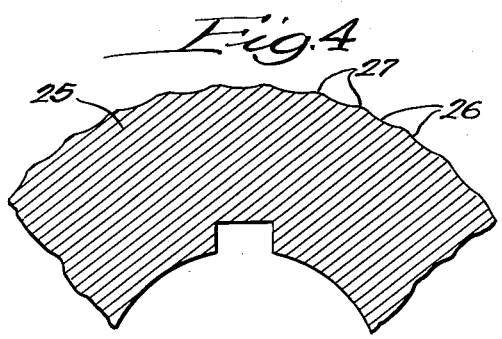
INVENTOR:
Adiel Y. Dodge,
BY Dawson, Ooms, Booth and Spangenberg,
ATTORNEYS.

Patented Mar. 17, 1953

2,631,706

UNITED STATES PATENT OFFICE 2,631,706

SPRAG TYPE ONE-WAY CLUTCH

Adiel Y. Dodge, Rockford, Ill.

Application March 26, 1949, Serial No. 83,661

4 Claims. (Cl. 192—45.1)

This invention relates to a one way clutch and more particularly to one way clutches of the tiltable gripper type.

One way clutches of the tiltable gripper type have a number of advantages and have been extensively used due in part to their ability to engage quickly in any position. However, I have found that when clutches of this type are subjected to vibrating loads they may have a tendency to slip so that their capacity for a given size is relatively limited.

It is one of the objects of the present invention to provide a one way clutch in which the tendency to slip under load is eliminated without interference with normal clutch operation during overrunning or light engagement.

Another object is to provide a one-way clutch in which one or both of the race surfaces are formed with a series of axially extending shallow grooves which are preferably of substantially the same curvature in section as the adjacent ends of the grippers and which are separated by cylindrical land portions.

The above and other objects and advantages of the invention will be more readily apparent when read in connection with the accompanying drawing, in which—

Figure 1 is an end view with parts in section of a one way clutch embodying the invention;

Figure 2 is a view similar to Figure 1 of an alternative construction;

Figure 3 is a partial enlarged section of the outer race; and

Figure 4 is a similar section of the inner race.

The clutch, as shown in Figure 1, comprises an outer annular race 10 and an inner concentric race 11 of smaller diameter than the outer race to leave a space between them. The races have facing substantially cylindrical surfaces which are adapted to engage tiltable grippers 12 having ends arcuately curved on substantially equal radii as shown about spaced centers so that when the grippers are tilted in one direction they will bind against the races to connect them and when they are tilted in the opposite direction they will release the races.

The grippers are held properly spaced by providing on their faces cylindrical projections 13 which engage each other when the grippers are assembled and serve to hold the grippers properly spaced without interfering with tilting thereof. To assist in bringing the grippers into engagement, they are formed in their ends with transverse grooves which receive an annular coil spring 14. The grooves lie at such an angle that they tend to bend the spring 14 so that it exerts a tilting force urging the grippers toward their engaged position. With this construction the grippers will engage quickly to connect the races when the outer race tends to turn counter-clockwise and will release to permit overrunning when the outer race tends to turn clockwise.

Another type of construction to which the present invention may be applied is illustrated in Figure 2 as including an outer annular race 15 and an inner cylindrical race 16. Tiltable grippers 17 having flat sides are mounted between the races and are held spaced by a cage having annular rings 18 connected by cross bars 19 between which the grippers fit. As in Figure 1, the grippers are formed in their ends with transverse grooves to receive an annular coil spring 21 which tends to urge them toward their engaged position.

According to the present invention either or both of the race surfaces may be formed with a series of shallow relatively narrow grooves separated by smooth cylindrical lands in order to limit slipping of the grippers under extremely heavy loads. Figure 3 shows an enlarged section of an outer race 22 formed on its inner working surface with a series of shallow grooves 23 extending axially of the race and separated by smooth cylindrical lands 24. The grooves 23 are of substantially the same curvature in section as the outer ends of the grippers. If the grippers should tend to slip over the lands 24, their ends will find the grooves 23 which will increase both the gripping area and the gripping angle between the grippers and the race surface so that further slipping will be prevented. It will be understood that the grooves are extremely shallow and are quite narrow so that during overrunning they will not interfere with the grippers and will, in fact, function in the manner of oil grooves to assist in maintaining an oil film between the gripper ends and the race surface.

Instead of forming the grooves in the outer race or an addition thereto, they may be formed in an inner race 25, as shown in Figure 4. As illustrated in this figure the outer surface of the inner race is formed with a series of shallow grooves 26 similar to the grooves 23 separated by smooth cylindrical lands 27. These grooves 26 will function in the same manner for the same purpose as the grooves 23 in the outer race and may be used with either a plain outer race or with a grooved outer race, as desired.

To form the grooves in the races according to the invention, the race or races in which the grooves are to be formed is turned to substantially its final shape with a smooth cylindrical surface but is not hardened. A set of completed and hardened grippers is then assembled with the races, and the assembly is loaded so that the ends of the grippers will press into the relatively soft race surface to form grooves therein. This operation may be repeated in two or more relative positions of the races and grippers to form any desired number of grooves with the desired spacing therebetween. It will be apparent that the grooves so formed will have a width equal to only a small fraction of the gripper width and will be very shallow on the order of a few thousandths of an inch.

Following this operation the parts are disassembled and the soft race or races are hardened in the usual manner. Following hardening, the grooved surface of the race or races is ground to remove any raised projections produced by the grooving operation and to provide smooth cylindrical lands, as shown at 24 and 27. The grinding operation will still further reduce the width and depth of the grooves to the extremely shallow and narrow grooves desired. Upon completion of the grinding operation, the races are finished and can be assembled with a set of grippers to form a finished clutch.

It is apparent that suitable tools can be made up incorporating grippers and used repeatedly to produce the brinelling or grooving operations in the races. It is not necessary to use the same grippers as will later be used in the finished product. While the method just described produces a peening operation which is decidedly beneficial to the surface metal, nevertheless satisfactory results in some cases can be had by broaching either the inner or outer race to produce the minute longitudinal grooves therein.

It will be noted that according to this method the proper spacing between the grooves in the races is assured so that all of the grippers will simultaneously engage a groove during operation. Thus the load is uniformly distributed among the grippers under all operation conditions. This method also insures that the grooves will be of the same curvature as the gripper ends so that when the grippers are in engagement with the grooves the maximum area of contact is provided.

While the invention has been illustrated and described in connection with two types of clutches, it will be apparent that the principles of the invention are applicable to many other types of clutches, and it is not intended to limit the scope of the invention to the exact clutches shown nor otherwise than by the terms of the appended claims.

What is claimed is:

1. A one way clutch comprising inner and outer races having facing concentric surfaces and tiltable grippers between the races formed with ends curved on substantially equal radii about spaced centers and engaging the surfaces, at least one of the surfaces being formed with a series of axial shallow grooves of substantially the same curvature in section as the adjacent ends of the grippers and spaced simultaneously to engage the ends of the grippers, said grooves being substantially narrower than the adjacent ends of the grippers and extremely shallow so that the grippers can slide over them when the grippers are tilted to their disengaged position and the grooves can function as oil grooves.

2. A one way clutch comprising inner and outer races having facing concentric surfaces and tiltable grippers between the races formed with ends curved on substantially equal radii about spaced centers and engaging the surfaces, the inner surface of the outer race being formed with a series of axial shallow grooves of substantially the same curvature in section as the outer ends of the grippers and spaced simultaneously to engage the ends of the grippers, said grooves being substantially narrower than the adjacent ends of the grippers and extremely shallow so that the grippers can slide over them when the grippers are tilted to their disengaged position and the grooves can function as oil grooves.

3. A one way clutch comprising inner and outer races having facing concentric surfaces and tiltable grippers between the races formed with ends curved on substantially equal radii about spaced centers and engaging the surfaces, the outer surface of the inner race being formed with a series of axial shallow grooves of substantially the same curvature in section as the inner ends of the grippers and spaced simultaneously to engage the ends of the grippers, said grooves being substantially narrower than the adjacent ends of the grippers and extremely shallow so that the grippers can slide over them when the grippers are tilted to their disengaged position and the grooves can function as oil grooves.

4. A one way clutch comprising inner and outer races having facing concentric surfaces and tiltable grippers between the races formed with ends curved on substantially equal radii about spaced centers and engaging the surfaces, at least one of the surfaces being formed with a series of axial shallow grooves separated by cylindrical surfaces concentric with the races, said grooves being substantially narrower than the adjacent ends of the grippers and extremely shallow so that the grippers can slide over them when the grippers are tilted to their disengaged position and the grooves can function as oil grooves.

ADIEL Y. DODGE.

REFERENCES CITED

The following references are of record in the file of this patent:

UNITED STATES PATENTS

| Number | Name | Date |
| --- | --- | --- |
| 1,952,461 | Roos | Mar. 27, 1934 |
| 2,021,921 | Osterholm | Nov. 26, 1935 |
| 2,070,892 | Gamble | Feb. 16, 1937 |
| 2,240,359 | Weigel | Apr. 29, 1941 |
| 2,366,842 | Dodge et al. | Jan. 9, 1945 |
| 2,366,843 | Dodge et al. | Jan. 9, 1945 |
| 2,432,842 | Wellman | Dec. 16, 1947 |

FOREIGN PATENTS

| Number | Country | Date |
| --- | --- | --- |
| 298,673 | Great Britain | Oct. 15, 1928 |
| 349,252 | Great Britain | May 28, 1931 |